United States Patent
Hamlin et al.

(10) Patent No.: US 9,779,230 B2
(45) Date of Patent: Oct. 3, 2017

(54) SYSTEM AND METHOD FOR OFF-HOST ABSTRACTION OF MULTIFACTOR AUTHENTICATION

(71) Applicant: Dell Products, LP, Round Rock, TX (US)

(72) Inventors: Daniel L. Hamlin, Round Rock, TX (US); Charles D. Robison, Jr., Buford, GA (US); Nicholas D. Grobelny, Austin, TX (US)

(73) Assignee: DELL PRODUCTS, LP, Austin, TX (US)

( * ) Notice: Subject to any disclaimer, the term of this patent is extended or adjusted under 35 U.S.C. 154(b) by 105 days.

(21) Appl. No.: 14/852,198

(22) Filed: Sep. 11, 2015

(65) Prior Publication Data

US 2017/0076087 A1   Mar. 16, 2017

(51) Int. Cl.
   *G06F 21/44*   (2013.01)
   *G06F 21/62*   (2013.01)

(52) U.S. Cl.
   CPC ........ *G06F 21/445* (2013.01); *G06F 21/6218* (2013.01)

(58) Field of Classification Search
   CPC .......................... G06F 21/445; G06F 21/6218
   See application file for complete search history.

(56) References Cited

U.S. PATENT DOCUMENTS

| | | | |
|---|---|---|---|
| 8,601,602 B1* | 12/2013 | Zheng | H04L 63/0853 726/2 |
| 8,683,232 B2 | 3/2014 | Yuen et al. | |
| 9,411,980 B2* | 8/2016 | Klein | G06F 1/00 |
| 2005/0228993 A1* | 10/2005 | Silvester | G06F 21/32 713/168 |
| 2006/0242427 A1 | 10/2006 | Ruzyski et al. | |
| 2007/0118900 A1* | 5/2007 | Focke | G06F 9/45537 726/22 |
| 2008/0115208 A1 | 5/2008 | Lee | |
| 2008/0183712 A1* | 7/2008 | Westerinen | G06F 21/121 |
| 2010/0199336 A1* | 8/2010 | Tan | H04L 63/0846 726/6 |
| 2011/0202983 A1* | 8/2011 | Pope | G06F 21/572 726/7 |
| 2013/0333003 A1* | 12/2013 | Roy | G06F 21/40 726/5 |

(Continued)

*Primary Examiner* — Hosuk Song
*Assistant Examiner* — J. Brant Murphy
(74) *Attorney, Agent, or Firm* — Larson Newman, LLP

(57) ABSTRACT

An information handling system includes a first processor, a second processor, and a third processor. The first processor requests a single-factor authentication from the second processor. The second processor receives a first authentication factor in response to the single-factor authentication request and requests a multi-factor authentication from the third processor. The third processor receives a second authentication factor in response to the multi-factor authentication request and provides the second authentication factor to the second processor. The second processor further verifies the first authentication factor and the second authentication factor and provides a single-factor authentication reply to the first processor in response to verifying the first authentication factor and the second authentication factor.

20 Claims, 6 Drawing Sheets

(56) References Cited

U.S. PATENT DOCUMENTS

| | | | |
|---|---|---|---|
| 2016/0019398 A1* | 1/2016 | Klein | G06F 1/00 726/27 |
| 2016/0050234 A1* | 2/2016 | Choyi | G06F 21/32 726/1 |
| 2016/0087957 A1* | 3/2016 | Shah | H04L 63/205 726/1 |
| 2016/0094539 A1* | 3/2016 | Suresh | H04L 67/025 726/7 |

* cited by examiner

SYSTEM AND METHOD FOR OFF-HOST ABSTRACTION OF MULTIFACTOR AUTHENTICATION

FIELD OF THE DISCLOSURE

This disclosure generally relates to information handling systems, and more particularly relates to a system and method for off-host abstraction of multifactor authentication in an information handling system.

BACKGROUND

As the value and use of information continues to increase, individuals and businesses seek additional ways to process, store, and communicate information. One option is an information handling system. Information handling systems generally process, compile, store, and/or communicate information or data for business, personal, or other purposes. Because technology and information handling needs and requirements vary between different applications, information handling systems may also vary regarding what information is handled, how the information is processed, stored, or communicated, and how quickly and efficiently the information may be processed, stored, or communicated. The variations in information handling systems allow information handling systems to be general purpose systems or to be configured for specific uses or users, such as for financial transaction or reservation processing, for enterprise data storage, for global communications, or for other specific uses or users. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
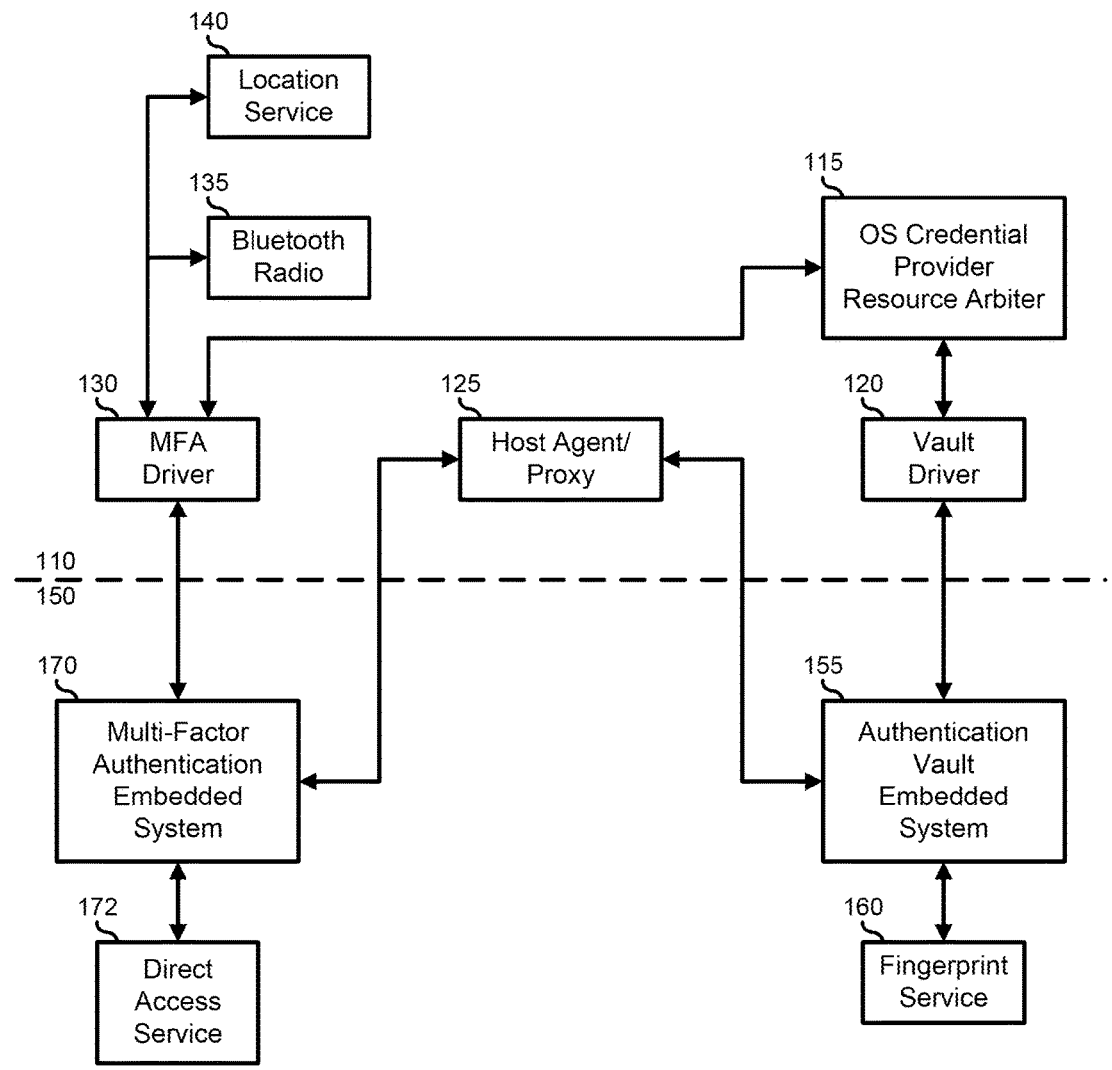
FIG. 1 is a block diagram illustrating an information handling system according to an embodiment of the present disclosure.

FIG. 1 illustrates an embodiment of an information handling system 100. For the purpose of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 includes a processor stack 110 and a service stack 150. Processor stack 110 represents a processor complex including one or more central processing units, input/output processing units such as chipset components, memory devices, input/output devices, and other hardware, and a Basic Input/Output System/Unified Extensible Firmware Interface (BIOS/UEFI), an operating system (OS), application programs and other software, and the like, that provide the information processing functions and features of information handling system 100. Service stack 150 represents resources of information handling system 100 that are isolated from processor stack 110, and that operate separately from a runtime environment hosted on the processor stack.

Processor stack 110 includes an operating system credential provider/resource arbiter, hereinafter referred to as resource arbiter 115, a vault driver 120, a host agent/proxy, hereinafter referred to as proxy 125, a multi-factor authentication (MFA) driver 130, a Bluetooth radio 135, and a location service 140. Service stack 150 includes an authenticated vault embedded system, hereinafter vault system 155, a fingerprint service 160, a MFA authentication embedded system, hereinafter MFA system 170, and a direct access service 172. Resource arbiter 115 represents a utility or application program interface (API) associated with an OS operating on processor stack 110 that forms a single point interface for all authentication activities needed or desired by the OS. For example, resource arbiter 115 can include a security application or API associated with a BIOS/UEFI, with an OS, with an application, or with another resource of processor stack 110. Vault driver 120, proxy 125, and MFA driver 130 represent elements of processor stack 110 that are typically installed or initialized in a BIOS/UEFI boot up process for information handling system 100, during a firmware installation operation, or the like. The functions and features of vault driver 120, proxy 125, and MFA driver 130 will be discussed further below.

Bluetooth radio 135 represents a data transmission device that operates in accordance with various Bluetooth specifications as maintained by the Bluetooth Special Interest Group, and permits the performance of authentication activities based upon the presence of an authentication device that is located within a personal area network (PAN) that is established by the Bluetooth radio. Location service 140 represents a connection to a device that provides authentication activities based upon the location of information handling device 100. For example, location service 140 can include a service that provides a location credential based upon a Global Positioning System (GPS), a location within a cellular telephone network, or another location based service, as needed or desired.

Authentication vault 155 represents a security processing system that operates to store and maintain security credentials, to request and process security templates from various security devices, and to authenticate the security templates based upon the stored security credentials. Authentication vault 155 operates on a stand-alone basis to perform storage and authentication activities on information handling system 100 out-of-band from processor stack 110 and any operating environment running thereon. An example of authentication vault 155 includes a Dell PowerVault authentication device, or another authentication device, as needed or desired. Fingerprint service 160 represents a biometric scanner device that operates to receive a scan of a user's fingerprint and to provide a security template based upon the fingerprint scan. Fingerprint service 160 is also representative of one or more additional types of biometric scanner devices, such as an iris scanner, a retinal scanner, a facial recognition camera, another biometric device, or a combination thereof, as needed or desired. MFA system 170 represents a hardware-based security device embedded into information handling system 100 that provides multi-factor authentication based upon multiple authentication devices. In a particular embodiment, MFA system 170 operates to provide a security overlay to a video display of information handling system 100. Direct access service 172 represents a provider of an authentication factor that is available to MFA system 170 out-of-band from processor stack 110 and any operating environment running thereon. An example of direct access service 172 includes a certificate service, a location service, a platform ID, or another service or authentication factor provider, as needed or desired. In particular, direct access service 172 can provide an authentication factor based upon information or resources included in information handling system 100, or can provide an authentication factor based upon information or resources that are accessed by the information handling system via a management network or a secure tunnel to a network interface device of the information handling system, as needed or desired.

In a particular embodiment, resource arbiter 115 receives single factor authentications from various resources of information handling system 100, including from Bluetooth radio 135, from location service 140, and from fingerprint service 160. For example, when a program or resource of processor stack 110 needs an authentication credential from fingerprint service 160, resource arbiter 115 issues an authentication request to vault driver 120. Vault driver 120 translates the authentication request to a GET credential request to vault system 155 which obtains the fingerprint credential from a user, based upon the user's fingertip swipe of fingerprint service 160. Vault system 155 verifies the fingertip swipe, and replies to the GET request with a pass/fail response, based upon whether or not the fingertip swipe is verified. Finally, vault driver 120 returns the pass/fail response to resource arbiter 115 in response to the authentication request.

Similarly, when a program or resource of processor stack 110 needs an authentication credential from Bluetooth radio 135 or location service 140, resource arbiter 115 issues an authentication request to MFA driver 130. MFA driver 130 translates the authentication request to a GET credential request to MFA system 170 which then directs the MFA driver to obtain the requested credential from one of Bluetooth radio 135 or location service 140. MFA driver 170 provides the requested credential to MFA system 170 and the MFA system verifies the credential and replies to MFA driver 130 with a pass/fail response, based upon whether or not the credential is verified. Finally, MFA driver 130 returns the pass/fail response to resource arbiter 115 in response to the authentication request. In another embodiment, when MFA driver 130 receives the authentication request from resource arbiter 115, the MFA driver obtains the requested credential from one of Bluetooth radio 135 or location service 140 directly, without passing the authentication request to MFA system 170 first.

Further, when a program or resource of processor stack 110 needs an authentication credential from direct access service 172, resource arbiter 115 issues an authentication request to MFA driver 130. MFA driver 130 translates the authentication request to a GET credential request to MFA system 170 which then directs obtains the requested credential from direct access service 172. MFA system 170 then verifies the credential and replies to MFA driver 130 with a pass/fail response, based upon whether or not the credential is verified. Finally, MFA driver 130 returns the pass/fail response to resource arbiter 115 in response to the authentication request.

In another embodiment, resource arbiter 115 receives multi-factor authentications from various resources of associated with MFA system 170, including Bluetooth radio 135, location service 140, and direct access service 172. For example, when a program or resource of processor stack 110 needs a multi-factor authentication credential from two or more of Bluetooth radio 135, location service 140, and direct access service 172, resource arbiter 115 issues an authentication request to MFA driver 130 for multi-factor authentication. MFA driver 130 translates the authentication request to a GET MFA credential request to MFA system 170 which then directs the MFA driver to obtain the requested MFA credential from Bluetooth radio 135 and location service 140, and obtains the requested MFA credential from direct access service 172, as needed. MFA driver provides the requested MFA credentials from Bluetooth radio 135 and location service 140 to MFA system 170 and the MFA system verifies the credentials, including any credential from direct access service 172, as needed, and replies to MFA driver 130 with a pass/fail response, based upon whether or not the credentials were both verified. Finally, MFA driver 130 returns the pass/fail response to resource arbiter 115 in response to the authentication request. In another embodiment, when MFA driver 130 receives the MFA request from resource arbiter 115, the MFA driver obtains the requested credentials from Bluetooth radio 135 and location service 140 directly, without passing the authentication request to MFA system 170 first.

Figure 2:
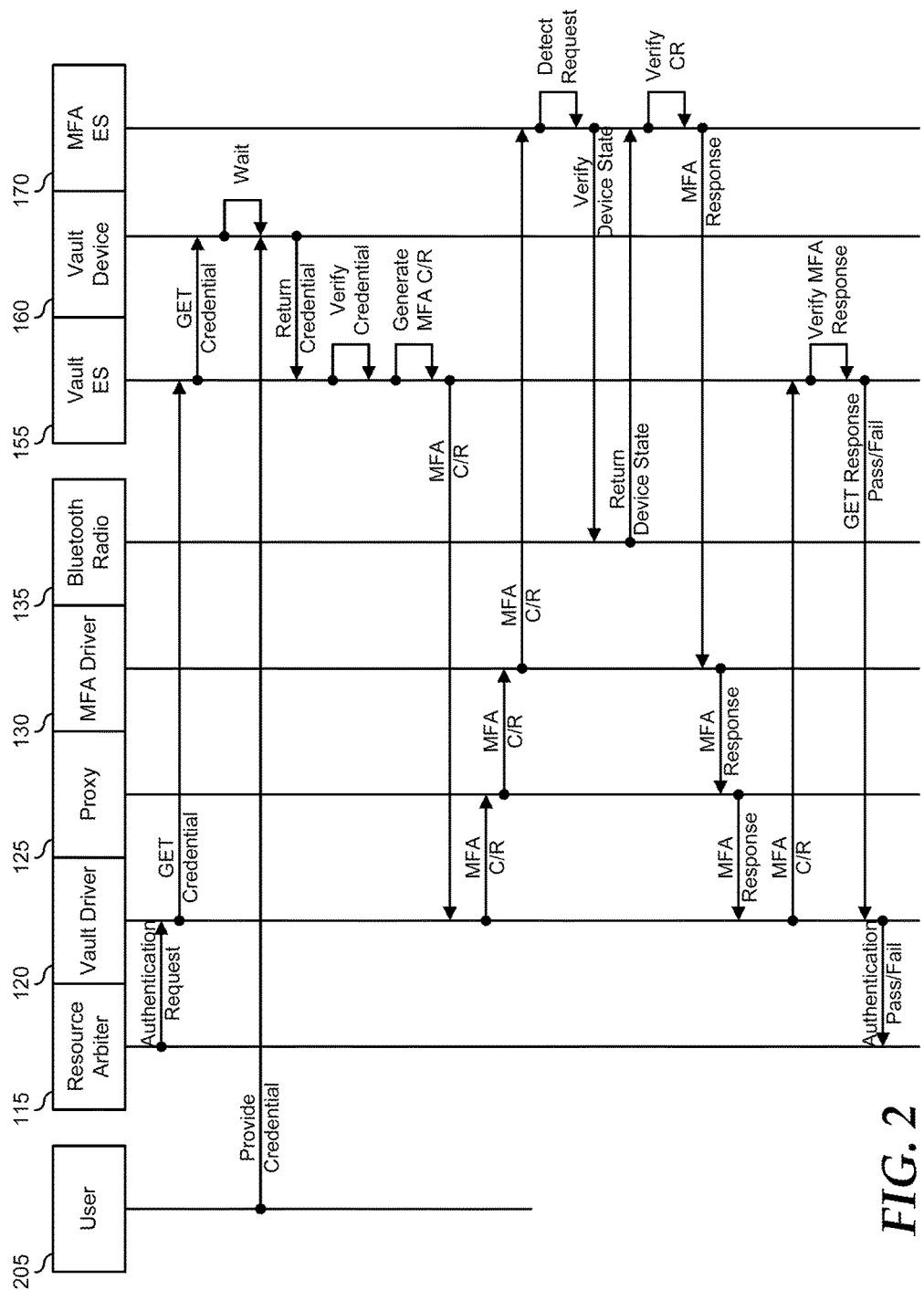
FIG. 2 is a flow diagram illustrating off-host abstraction of multifactor authentication in the information handling system of FIG. 1.

In yet another embodiment, shown in FIG. 2, resource arbiter 115 receives multi-factor authentications from various resources of information handling system 100, including from both fingerprint service 160, and also from one or more of Bluetooth radio 135, location service 140, or direct access service 172, where the multi-factor authentications are based upon single-factor authentication requests. For example, when a program or resource of processor stack 110 needs a multi-factor authentication credential from both fingerprint service 160 and from Bluetooth radio 135, resource arbiter 115 issues a multi-factor authentication request to vault driver 120. Vault driver 120 translates the authentication request to a GET credential request to vault system 155 which obtains the fingerprint credential from a user 205, based upon the user's fingertip swipe of fingerprint service 160. Vault system 155 verifies the fingertip swipe, and, if the fingertip swipe is verified, generates a MFA challenge/response (C/R) request to obtain an authentication credential from Bluetooth radio 135. Vault system 155 sends the MFA C/R request to vault driver 120. Vault driver 120 forwards the MFA C/R to MFA system 170 via proxy 125 and MFA driver 130. MFA system 170 then directs MFA driver 130 to obtain the requested credential from Bluetooth radio 135. MFA driver 170 provides the requested credential to MFA system 170 and the MFA system verifies the credential and replies to MFA driver 130 with a MFA C/R response, based upon whether or not the credential is verified. The MFA C/R response is returned to vault system 155 via proxy 125 and vault driver 120. Vault system 155 verifies the MFA C/R response and returns a pass/fail response to vault driver 120 which forwards the pass/fail response to resource arbiter 115 in response to the authentication request. Note that when the fingertip swipe is not verified, vault system 155 can send a pass/fail response directly to vault driver 120 without generating the MFA C/R. When a program or resource of processor stack 110 needs a multi-factor authentication credential from both fingerprint service 160 and from direct access service 172, the credential can be obtained from the direct access service similarly to the way a credential is obtained from Bluetooth radio 135, except that the credential is obtained by MFA system 170 directly, rather than by invoking the action of MFA driver 130 to obtain the credential.

Proxy 125 represents a communication channel between vault system 155 and MFA system 170 that resides and operates in processor stack 110, but that operates outside of the detection of resource arbiter 115. In particular, where an OS is configured to control all authentication activities, the multi-factor authentication as shown in FIG. 2 may not be permissible where resource arbiter 115 operates to separately request authentication via fingerprint service 160, and also via one of Bluetooth radio 135 and location service 140, without the agency of proxy 125. As such, in a particular embodiment, proxy 125 represents a driver or API that operates within an OS environment by operating in a virtualized context, via a secure tunnel such as Virtual Private Network (VPN), or by another method or mechanism within the OS environment that is isolated from the OS. In another embodiment, proxy 125 represents a BIOS/UEFI sideband mechanism that is loaded at the boot up of information handling system 100. For example proxy 125 can represent a BIOS/UEFI mailbox, such as via a System Management Interrupt (SMI), via an Advanced Configuration and Power Interface (ACPI) Source Language (ASL) mailbox, via a UEFI variable service, or another method or mechanism within the BIOS/UEFI, as needed or desired.

Figure 3:
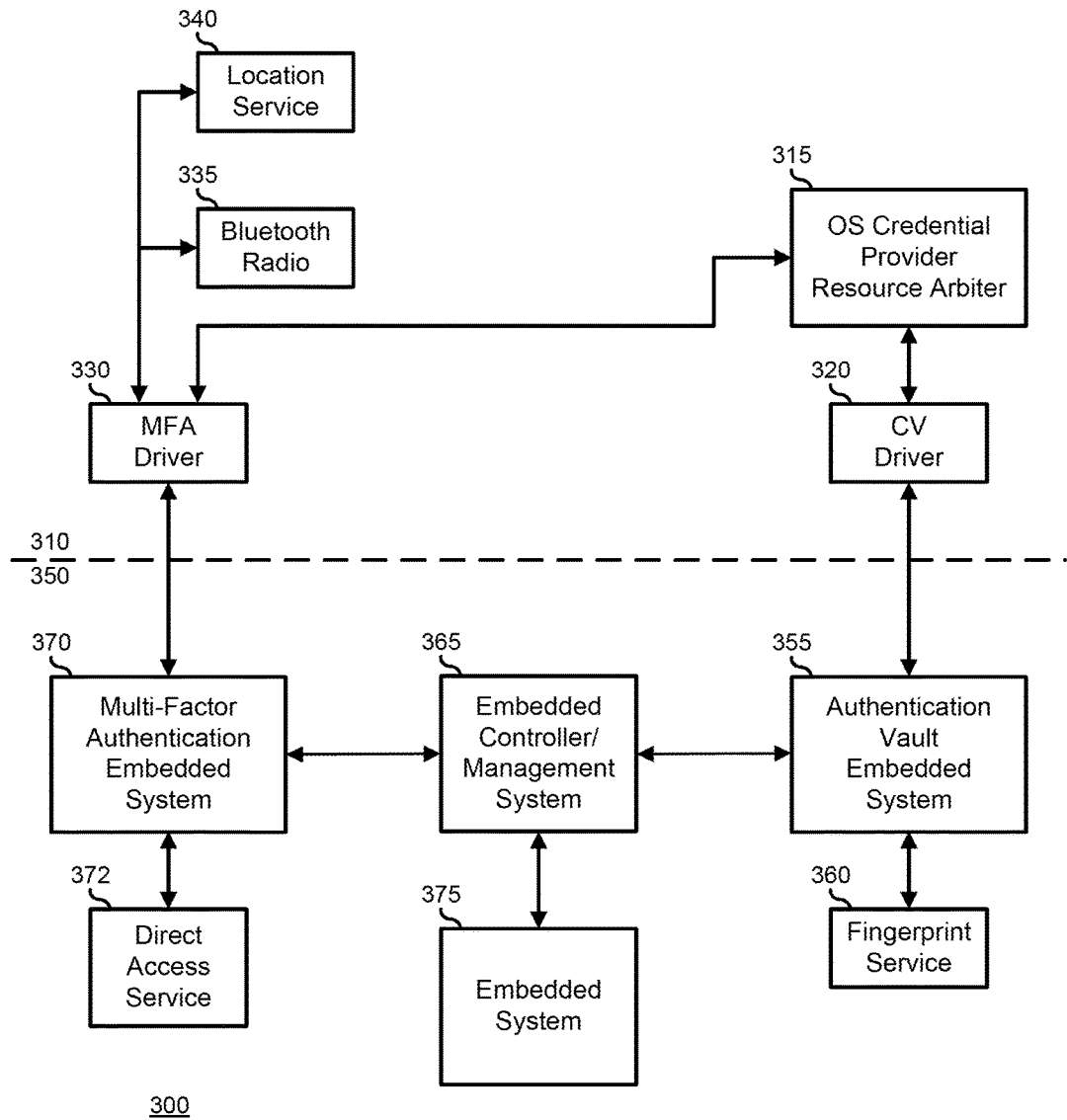
FIG. 3 is a block diagram illustrating an information handling system according to another embodiment of the present disclosure.

FIG. 3 illustrates another embodiment of an information handling system 300 similar to information handling system 100, including a processor stack 310 similar to processor stack 110 and a service stack 350 similar to service stack 150. Processor stack 310 includes an operating system credential provider/resource arbiter, hereinafter referred to as resource arbiter 315, a vault driver 320, a MFA driver 330, a Bluetooth radio 335, and a location service 340. Service stack 350 includes an authenticated vault embedded system, hereinafter vault system 355, a fingerprint service 360, an embedded controller/management system, hereinafter management system 365, a MFA authentication embedded system, hereinafter MFA system 370, a direct access service 372, and one or more additional embedded system 375.

Embedded controller 365 represents a service processor that monitors the state of the hardware, devices, and software of information handling system 300, using sensors and communicating with the system administrator through an independent connection to provide out-of-band management of the information handling system. An example of embedded controller 366 includes a Baseboard Management Controller (BMC), an Integrated Dell Remote Access Controller (IDRAC), an ACPI based service processor, or the like. Embedded controller 365 is coupled to vault system 355, to MFA system 370, and to embedded system 375 via one or more communication links as are known in the art. For example, the communication link can include an I2C bus, a LPC bus, a USB link, a PCIe link, another communications link, or a combination thereof. Embedded system 375 represents one or more additional service processors of information handling system 300 that can be configured to interact with one or more additional authentication services as needed or desired.

Resource arbiter 315 operates to receive single factor authentications from various resources of information handling system 300, including from Bluetooth radio 335, from location service 340, from fingerprint service 360, and from direct access service 372, and the resource arbiter also operates to receive multi-factor authentications from the various resources associated with MFA system 170, including the Bluetooth radio, the location service 140, and the direct access service, as described above with respect to FIG. 1.

Figure 4:
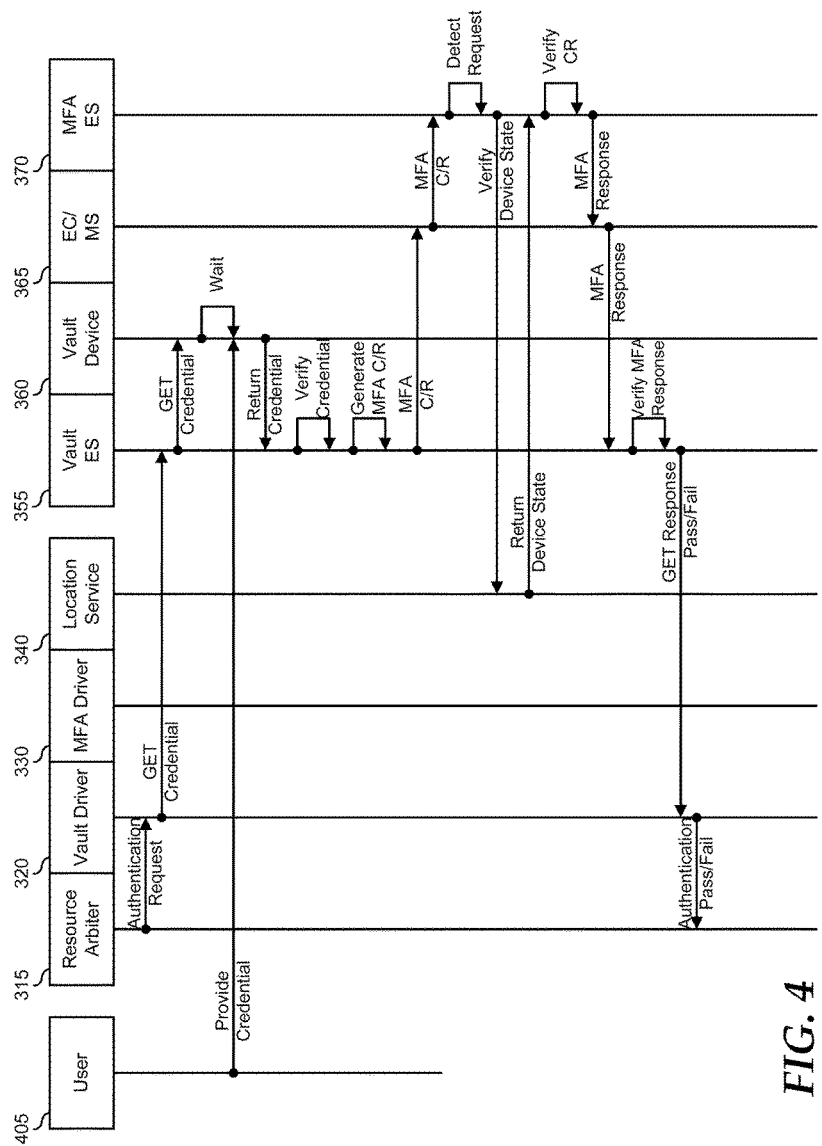
FIG. 4 is a flow diagram illustrating off-host abstraction of multifactor authentication in the information handling system of FIG. 3.

In a particular embodiment, shown in FIG. 4, resource arbiter 315 receives multi-factor authentications from various resources of information handling system 300, including from both fingerprint service 360, and also from one of Bluetooth radio 335 or location service 340, where the multi-factor authentications are based upon single-factor authentication requests. For example, when a program or resource of processor stack 310 needs a multi-factor authentication credential from both fingerprint service 360 and from location service 340, resource arbiter 315 issues a multi-factor authentication request to vault driver 320. Vault driver 320 translates the authentication request to a GET credential request to vault system 355 which obtains the fingerprint credential from a user 405, based upon the user's fingertip swipe of fingerprint service 360. Vault system 355 verifies the fingertip swipe, and, if the fingertip swipe is verified, generates a MFA C/R request to obtain an authentication credential from location service 340. Vault system 355 sends the MFA C/R request to embedded controller 365 which forwards the MFA C/R to MFA system 370. MFA system 370 then directs MFA driver 330 to obtain the requested credential from Bluetooth radio 335. MFA driver 370 provides the requested credential to MFA system 370 and the MFA system verifies the credential and replies to embedded controller 365 with a MFA C/R response, based upon whether or not the credential is verified. Embedded controller 365 returns the MFA C/R response to vault system 355, and the vault system verifies the MFA C/R response and returns a pass/fail response to vault driver 320 which forwards the pass/fail response to resource arbiter 315 in response to the authentication request. Note that when the fingertip swipe is not verified, vault system 355 can send a pass/fail response directly to vault driver 320 without generating the MFA C/R. When a program or resource of processor stack 310 needs a multi-factor authentication credential from both fingerprint service 360 and from direct access service 372, the credential can be obtained from the direct access service similarly to the way a credential is obtained from Bluetooth radio 335, except that the credential is obtained by MFA system 370 directly, rather than by invoking the action of MFA driver 330 to obtain the credential.

In a particular embodiment, either one of vault system 155 and vault system 355 operate to pre-provision various authentication credentials from the associated one of MFA system 170 and MFA system 370. Here, the pre-provisioning can be performed prior to shipment of the subject information handling system. For example, where a secondary factor represents a hardware configuration authentication of the information handling system, the verification of the hardware configuration can be verified by the MFA system once, and provide a prospective MFA C/R reply to the vault system, and the vault system can store the MFA C/R reply until such time as the vault system receives a MFA authentication request. Then, when the fingertip swipe is verified, the vault system can provide the pass/fail reply to the vault driver based upon the fingertip swipe and the stored MFA C/R reply. In this way, the authentication process can be greatly sped up. In another example, where a secondary factor represents an authentication of the location of the information handling system, the MFA system can maintain a running authentication based upon the changing location of the information handling system, and can either have the MFA C/R reply prepared against the eventuality of a MFA authentication request, or can provide the MFA C/R reply prospectively to the vault system.

Figure 5:
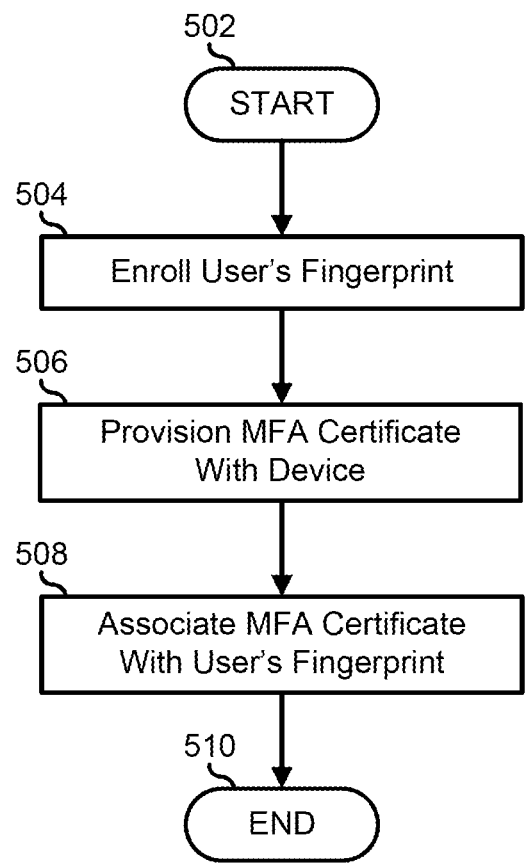
FIG. 5 is a flowchart illustrating a method for off-host abstraction of multifactor authentication in an information handling system according to an embodiment of the present disclosure.

FIG. 5 illustrates a method 5 for off-host abstraction of multifactor authentication in an information handling system starting at block 502. In block 504, a user's fingerprint scan is enrolled with a vault system. Here, upon a first use of the information handling system, the user can be prompted to provide a fingerprint scan to bind the user's fingerprint scan to the information handling system. In block 506, an MFA certificate is provisioned by the MFA system for a particular device or factor. For example, a certificate can be provision by the MFA system based upon the hardware configuration of the information handling system. In block 508, the MFA certificate is associated with the user's fingerprint scan by the vault system, thereby binding to the fingerprint scan the certificate based upon the device, and the method ends in block 510.

Figure 6:
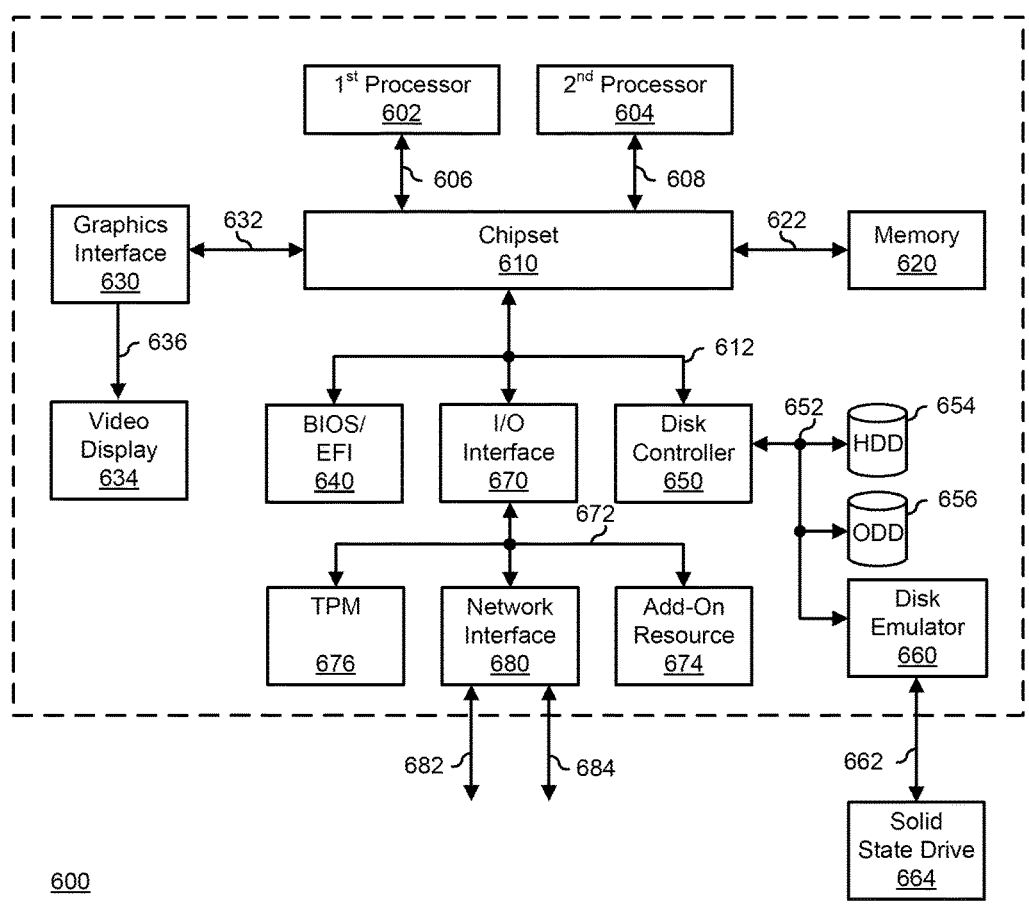
FIG. 6 is a block diagram illustrating a generalized information handling system according to an embodiment of the present disclosure.

FIG. 6 illustrates a generalized embodiment of information handling system 600. For purpose of this disclosure information handling system 600 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described above, and operates to perform one or more of the methods described above. Information handling system 600 includes a processors 602 and 604, a chipset 610, a memory 620, a graphics interface 630, include a basic input and output system/extensible firmware interface (BIOS/EFI) module 640, a disk controller 650, a disk emulator 660, an input/output (I/O) interface 670, and a network interface 680. Processor 602 is connected to chipset 610 via processor interface 606, and processor 604 is connected to the chipset via processor interface 608. Memory 620 is connected to chipset 610 via a memory bus 622. Graphics interface 630 is connected to chipset 610 via a graphics interface 632, and provides a video display output 636 to a video display 634. In a particular embodiment, information handling system 600 includes separate memories that are dedicated to each of processors 602 and 604 via separate memory interfaces. An example of memory 620 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 640, disk controller 650, and I/O interface 670 are connected to chipset 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 640 includes BIOS/EFI code operable to detect resources within information handling system 600, to provide drivers for the resources, initialize the resources, and access the resources. BIOS/EFI module 640 includes code that operates to detect resources within information handling system 600, to provide drivers for the resources, to initialize the resources, and to access the resources.

Disk controller 650 includes a disk interface 652 that connects the disc controller to a hard disk drive (HDD) 654, to an optical disk drive (ODD) 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits a solid-state drive 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O interface 670 includes a peripheral interface 672 that connects the I/O interface to an add-on resource 674, to a TPM 676, and to network interface 680. Peripheral interface 672 can be the same type of interface as I/O channel 612, or can be a different type of interface. As such, I/O interface 670 extends the capacity of I/O channel 612 when peripheral interface 672 and the I/O channel are of the same type, and the I/O interface translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as chipset 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   requesting, from a first processor of an information handling system, a single-factor authentication from a second processor of the information handling system;
   receiving a first authentication factor in response to the single-factor authentication request;
   requesting, from the second processor, a multi-factor authentication from a third processor of the information handling system via a Baseboard Management Controller (BMC) of the information handling system;
   receiving a second authentication factor in response to the multi-factor authentication request via the BMC;
   providing, from the third processor, the second authentication factor to the second processor;
   verifying the first authentication factor and the second authentication factor; and
   providing, from the second processor, a single-factor authentication reply to the first processor in response to verifying the first authentication factor and the second authentication factor.

2. The method of claim 1, further comprising:
   instantiating an operating system on the first processor, wherein the single-factor authentication request is from the operating system.

3. The method of claim 2, wherein the second processor, the third processor, and the BMC are isolated from the operating system.

4. The method of claim 1, further comprising:
- receiving a third authentication factor in response to the multi-factor authentication request;
- providing, from the third processor, the third authentication factor to the second processor;
- verifying the third authentication factor; and
- providing, from the second processor, the single-factor authentication reply to the first processor in further response to verifying the third authentication factor.

5. The method of claim 4, wherein the third authentication factor includes an authentication credential from a location service.

6. The method of claim 4, wherein the third authentication factor includes an authentication credential from a direct access service.

7. The method of claim 1, wherein the first authentication factor includes a template based upon a fingerprint scan.

8. The method of claim 1, wherein the second authentication factor includes an authentication credential from a Bluetooth radio.

9. An information handling system, comprising:
- a first processor;
- a second processor;
- a third processor; and
- a baseboard management controller (BMC);
- wherein the first processor requests a single-factor authentication from the second processor, the second processor receives a first authentication factor in response to the single-factor authentication request and requests a multi-factor authentication from the third processor, the third processor receives a second authentication factor in response to the multi-factor authentication request and provides the second authentication factor to the second processor, the second processor verifies the first authentication factor and the second authentication factor and provides a single-factor authentication reply to the first processor in response to verifying the first authentication factor and the second authentication factor, and the second processor requests the multi-factor authentication from the third processor and receives the second authentication factor from the third processor via the BMC.

10. The information handling system of claim 9, wherein the first processor instantiates an operating system, and the single-factor authentication request is from the operating system.

11. The information handling system of claim 10, wherein the second processor, the third processor, and the BMC are isolated from the operating system.

12. The information handling system of claim 9, wherein the third processor receives a third authentication factor in further response to the multi-factor authentication request and provides the third authentication factor to the second processor, and the second processor verifies third authentication factor, and wherein the single-factor authentication reply is in further response to verifying the third authentication factor.

13. The information handling system of claim 12, wherein the third authentication factor includes an authentication credential from a location service.

14. The information handling system of claim 12, wherein the third authentication factor includes an authentication credential from a direct access service.

15. The information handling system of claim 9, wherein the first authentication factor includes a template based upon a fingerprint scan.

16. The information handling system of claim 9, wherein the second authentication factor includes an authentication credential from a Bluetooth radio.

17. A non-transitory computer-readable medium including code for performing a method, the method comprising:
- requesting, from a first processor of an information handling system, a single-factor authentication from a second processor of the information handling system;
- receiving a first authentication factor in response to the single-factor authentication request;
- requesting, from the second processor, a multi-factor authentication from a third processor of the information handling system via a Baseboard Management Controller (BMC) of the information handling system;
- receiving a second authentication factor in response to the multi-factor authentication request via the BMC;
- providing, from the third processor, the second authentication factor to the second processor;
- verifying the first authentication factor and the second authentication factor; and
- providing, from the second processor, a single-factor authentication reply to the first processor in response to verifying the first authentication factor and the second authentication factor.

18. The computer-readable medium of claim 17, wherein the first authentication factor includes a template based upon a fingerprint scan.

19. The computer-readable medium of claim 17, wherein the second authentication factor includes an authentication credential from a Bluetooth radio.

20. The computer-readable medium of claim 17, the method further comprising:
- receiving a third authentication factor in response to the multi-factor authentication request;
- providing, from the third processor, the third authentication factor to the second processor; and
- verifying the third authentication factor;
- wherein providing the single-factor authentication reply is in further response to verifying the third authentication factor.

* * * * *